United States Patent [19]

Keogh

[11] Patent Number: 4,593,072

[45] Date of Patent: Jun. 3, 1986

[54] RELATIVELY WATER-STABLE COMPOSITIONS BASED ON THERMOPLASTIC POLYMERS CONTAINING PENDANT SILANE MOIETIES

[75] Inventor: Michael J. Keogh, Bridgewater, N.J.

[73] Assignee: Union Carbide Corporation, Danbury, Conn.

[21] Appl. No.: 669,755

[22] Filed: Nov. 9, 1984

Related U.S. Application Data

[63] Continuation-in-part of Ser. No. 534,354, Sep. 23, 1983, Pat. No. 4,526,930.

[51] Int. Cl.$^4$ .................. C08L 43/04; C08L 51/06
[52] U.S. Cl. .................. 525/326.5; 525/106; 525/288; 525/370; 525/384
[58] Field of Search .................. 525/288, 326.5, 370, 525/384, 106

[56] References Cited

U.S. PATENT DOCUMENTS

| | | | |
|---|---|---|---|
| 3,646,155 | 2/1972 | Scott | 525/288 |
| 4,058,583 | 11/1977 | Glander et al. | 264/176 R |
| 4,153,765 | 5/1979 | Tsai | 525/384 |
| 4,291,136 | 9/1981 | Keogh | 525/102 |
| 4,328,323 | 5/1982 | Keogh | 525/106 |
| 4,435,536 | 3/1984 | Kato et al. | 525/326.5 |

FOREIGN PATENT DOCUMENTS

| | | | |
|---|---|---|---|
| 0012058 | 1/1982 | Japan | 525/326.5 |
| 0170168 | 9/1984 | Japan | 525/326.5 |
| 2101138 | 1/1983 | United Kingdom . | |

*Primary Examiner*—Wilbert J. Briggs, Sr.
*Attorney, Agent, or Firm*—James C. Arvantes; Robert C. Brown

[57] ABSTRACT

Relatively water-stable compositions comprising a thermoplastic polymer having hydrolyzable, pendant silane moieties, a primary or secondary monohydric alcohol and an organo titanate esterification catalyst, which can be activated and extruded about wires and cables and water-cured to crosslinked products.

6 Claims, No Drawings

RELATIVELY WATER-STABLE COMPOSITIONS BASED ON THERMOPLASTIC POLYMERS CONTAINING PENDANT SILANE MOIETIES

This application is a continuation-in-part of copending application Ser. No. 534,354, filed Sept. 23, 1983, now U.S. Pat. No. 4,526,930.

SUMMARY OF THE INVENTION

This invention relates to relatively water-stable compositions comprising a thermoplastic polymer having hydrolyzable, pendant silane moieties, a primary or secondary monohydric alcohol and an organo titanate esterification catalyst. The relatively water-stable compositions of this invention can be activated, that is, made readily water-curable, extruded about wires and cables and water-cured to crosslinked products.

Currently, two major processes, so-called peroxide-curing and water-curing, are being employed in the application of protective coatings such as insulation and jacketing about wires and cables. The peroxide-curing process involves extruding compositions, containing an organic peroxide, about wires and cables and subjecting the resultant articles to elevated temperatures in order to cure the compositions to crosslinked products. The overall operation requires careful control of the process parameters in order to avoid undue heat and pressure build-up in the extruder. Undue heat and pressure build-up results in premature decomposition of the peroxides which in turn results in crosslinking of the compositions in the extruder. Cross-linking of the compositions in the extruder, commonly referred to as "scorch" necessitates, in extreme cases, stopping the operation and cleaning the extruder. In situations wherein "scorch" occurs but is not as severe, it has been found that the work-life of the ultimate coatings is relatively short. In addition to the processing difficulties of peroxide-curing, the peroxide containing compositions do not have that degree of resistivity to deformation, at normal peroxide loadings, demanded by many ultimate users of insulated and jacketed wire and cable articles.

The water-curing process, on the other hand, involves compositions containing hydrolyzable, silane modified thermoplastic polymers and is more commercially attractive in that a wider latitude in processing conditions is possible. That is, compositions containing water-curable, silane modified polymers can be extruded at temperatures far in excess of maximum processing temperatures used in extruding peroxide containing compositions. Being capable of extrusion at higher temperatures, such compositions can be extruded at faster rates and under lower pressure and consequently are more cost effective.

A disadvantage with respect to the so-called water-curing process, however, is the water sensitivity of the polymers involved. Water-curable polymers which are commercially available have hydrolyzable, pendant silane moieties of the formula:

$$\begin{array}{c} V \\ | \\ -Si-OR \\ | \\ V \end{array} \quad \text{FORMULA I}$$

wherein R is methyl, ethyl or propyl and each V which can be the same or different is a hydrocarbon radical having one to 18 carbon atoms inclusive or —(OR) wherein R is as previously defined. Such polymers are known to prematurely crosslink under normal conditions of handling and storage. As a result, commercial acceptance of the water-curing process has been limited in the United States.

DETAILED DESCRIPTION OF THE INVENTION

The present invention provides compositions, based on commercially available, water-curable polymers which are relatively water-stable but which can be activated and used in extrusion applications, for example, as extrudates about wires and cables.

The compositions of this invention comprise a water-curable polymer having hydrolyzable, pendant silane moieties of the formula:

$$\begin{array}{c} V \\ | \\ -Si-OR \\ | \\ V \end{array} \quad \text{FORMULA II}$$

wherein each V and R are as previously defined; a primary monohydric alcohol having at least 4 carbon atoms, generally having 4 to 18 carbon atoms inclusive or a secondary monohydric alcohol having at least 3 carbon atoms, generally having 3 to 18 carbon atoms inclusive; and an organo titanate esterification catalyst wherein the monohydric alcohol is present in at least a stoichiometric amount with respect to the hydrolyzable groups of the silane moieties of the thermoplastic polymer. For purposes of stoichiometric calculations, one alcohol molecule is deemed to react with one hydrolyzable group; and the organo titanate esterification catalyst is used in amounts sufficient to catalyze the transesterification reaction between the ester groups of the silane moieties and the monohydric alcohol.

The transesterification reaction can be depicted as follows:

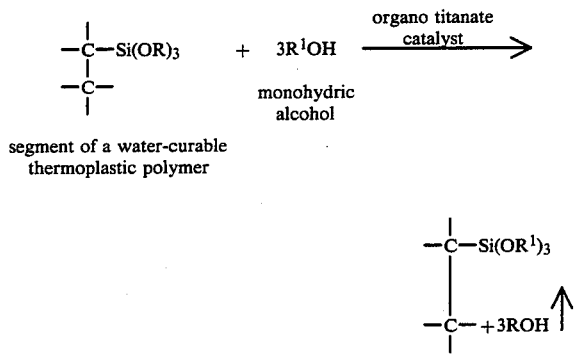

If preferred, a stoichiometric excess of monohydric alcohol is used in order to insure completion of the transesterification reaction.

Water-curable, thermoplastic polymers having hydrolyzable, pendant silane moieties can be prepared by a number of convenient processes including:

A. Reacting a thermoplastic polymer with an appropriate vinyl silane in the presence of an organic peroxide as described in U.S. Pat. No. 3,646,155, patented Feb. 29, 1972.

B. Reacting an alkylene-alkyl acrylate copolymer with an appropriate silane in the presence of an organo titanate as described in U.S. Pat. No. 4,291,136, patented Sept. 22, 1981.

C. Reacting an alkylene-alkyl acrylate copolymer with an appropriate polysiloxane in the presence of an organo titanate as described in U.S. Pat. No. 4,328,323, patented May 4, 1982.

D. Reacting a thermoplastic copolymer with an appropriate silane sulfonyl azide as described in U.S. Pat. No. 3,697,551, patented Oct. 10, 1972.

E. Reacting an olefinic monomer with an appropriate unsaturated silane as described in U.S. Pat. No. 3,225,018, patented Dec. 21, 1965.

Illustrative of thermoplastic polymers which can be reacted with silanes, according to one or more processes A-D, identified above, are normally solid homopolymers and interpolymers of mono-olefins and diolefins.

Suitable polymerizable monoolefins have the general formula:

$$C_\alpha H_{2\alpha} \qquad \text{FORMULA III}$$

wherein $\alpha$ has a value of at least 2. Exemplary of olefins falling within the scope of Formula III are: ethylene, propylene, butene-1, pentene-1, 4-methyl-pentene-1, hexene-1, heptene-1, octene-1 and the like.

Suitable polymerizable diolefins have the general formula:

$$C_\beta H_{2\beta-2} \qquad \text{FORMULA IV}$$

wherein $\beta$ has a value of at least 3. Exemplary of diolefins falling within the scope of Formula IV are: 1,4-pentadiene, 1,4-hexadiene, 1,5-hexadiene, 1,4-octadiene, ethylidene norbornene and the like.

Illustrative of monomers which can be polymerized with mono-olefins and/or diolefins are styrene, p-methyl styrene, α-methyl styrene, p-chloro styrene, vinyl naphthalene and similar aryl olefins and substituted aryl olefins; nitriles such as acrylonitrile, methacrylonitrile, α-chloroacrylonitrile and the like; vinyl methyl ketone, vinyl methyl ether, vinylidene chloride; alkyl acrylates which fall within the scope of the following formula:

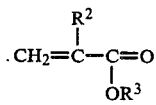

FORMULA V wherein $R^2$ is hydrogen or methyl and $R^3$ is alkyl having 1 to 8 carbon atoms inclusive. Illustrative compounds encompassed by this formula are: methyl acrylate, ethyl acrylate, t-butyl acrylate, methyl methacrylate, n-butyl acrylate, n-butyl methacrylate, 2-ethylhexyl acrylate, chloroethyl acrylate and the like; provided that the olefinic content is at least about 0.1 percent by weight, preferably about 1 to about 50 percent by weight.

Desirable polymers are alkylene-alkyl acrylate copolymers generally having a density (ASTM D-1505 with conditioning as in ASTM D-147-72) of about 0.92 to about 0.94 and a melt index (ASTM D-1238 at 44 psi tested pressure) of about 0.1 to about 500 decigrams per minute. These copolymers generally have about 1 to about 50 percent by weight combined alkyl acrylate, preferably about 2 to about 20 percent by weight combined alkyl acrylate.

Preferred polymers are ethylene-propylene copolymers, ethylene-butene copolymers, ethylene-hexene copolymers and the like produced under low pressures on the order of about 15 to about 300 psi, using a chromium oxide catalyst modified with titanium as disclosed in U.S. Pat. No. 4,011,382, patented Mar. 8, 1977.

Particularly preferred polymers have densities (ASTM D-1505) of about 0.875 to about 0.970, preferably about 0.875 to about 0.930. These polymers can be prepared by reacting a mixture containing about 50 to about 99.9 mole percent, preferably about 75 to about 96 mole percent ethylene and from about 0.1 to about 50 mole percent and preferably about 4 to about 25 mole percent of one or more $C_3$ to $C_8$ alpha olefins as previously described.

It is to be understood that mixtures of reactants can be polymerized to produce suitable polymers.

Illustrative of monomers and mixtures thereof to be reacted with an appropriate silane in accordance with process E are those monomers previously described.

Suitable silane reactants for purposes of this invention include, among others, silanes of Formulas VI and VII.

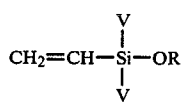

FORMULA VI wherein each V and R are as previously defined, such as vinyltrimethoxy silane, vinyltriethoxy silane, vinyltris(n-propoxy) silane, vinyl-bis(methoxy)methyl silane, vinyl-bis(ethoxy)methyl silane, vinyl-bis(n-propoxy)-methyl silane, vinyl(methoxy)dimethyl silane, vinyl(ethoxy)dimethyl silane and the like.

Other suitable silanes fall within the scope of the following formula:

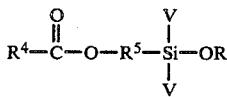

FORMULA VII wherein $R^4$ is a monovalent hydrocarbon radical having a maximum of 18 carbon atoms as for example an alkyl radical having 1 to 18 carbon atoms inclusive, preferably 1 to 4 carbon atoms inclusive such as methyl, ethyl, n-propyl, isopropyl, n-butyl and the like; an alkylene radical having 2 to 18 carbon atoms inclusive, preferably 2 to 4 carbon atoms inclusive such as ethylene, propylene, isobutylene and the like; an aryl radical having 6 to 10 carbon atoms inclusive such as phenyl, benzyl and the like. Other variables are as previously defined.

Illustrative of suitable radicals for $R^5$ are alkylene radicals having 1 to 18 carbon atoms inclusive, preferably 1 to 6 carbon atoms inclusive, such as methylene, ethylene, propylene, butylene, hexylene and the like; alkoxy radicals having 1 to 18 carbon atoms inclusive, preferably 1 to 6 carbon atoms inclusive such as methyloxymethyl, methyloxypropyl, ethyloxyethyl, ethyloxypropyl, propyloxypropyl, propyloxybutyl, propyloxyhexyl and the like.

Exemplary of suitable silanes falling within the scope of Formula VII are the following:

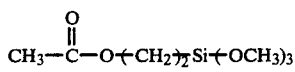

acetooxyethyltrimethoxy silane

acetooxyethyltriethoxy silane

acetooxyethyl-tris-(2-methoxyethoxy) silane

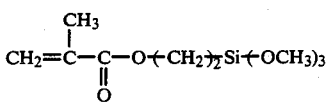

β-methacryloxyethyltrimethoxy silane

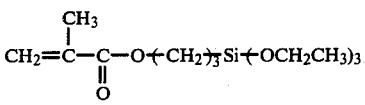

γ-methacryloxypropyltriethoxy silane

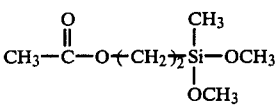

acetooxyethylmethyldimethoxy silane

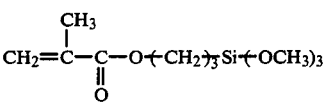

γ-methacryloxypropyltrimethoxy silane

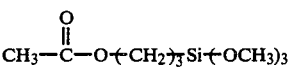

acetooxypropyltrimethoxy silane

acetooxypropyltriethoxy silane

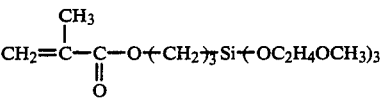

γ-methacryloxypropyl-tris-(2-methoxyethoxy) silane

Polysiloxanes suitable for reaction according to process C contain repeating units of the formula:

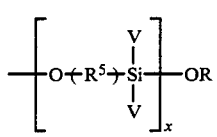
FORMULA VIII wherein x is an integer having a value of at least 2, generally 2 to 1000 inclusive, preferably 5 to 25 inclusive, n is an integer of 1 to 18 inclusive and the other variables are as defined.

Silanes which can be reacted with thermoplastic polymers according to process D include, among others, silanes disclosed in U.S. Pat. No. 3,697,551, with groups attached to the silicon atom, corresponding to V and R in Formula I of this specification.

Illustrative of suitable primary and secondary alcohols for purposes of this invention are: isopropyl alcohol, n-butyl alcohol, isobutyl alcohol, sec-butyl alcohol, amyl alcohol, isoamyl alcohol, sec-amyl alcohol, n-hexyl alcohol, 2-ethylhexyl alcohol, n-octyl alcohol, n-decyl alcohol and other like alcohols having the general formula $R^1OH$ wherein $R^1$ is a monovalent hydrocarbon radical having a maximum of 18 carbon atoms.

The esterification catalysts are organo titanates which, in general, fall within the scope of the formula:

$$Ti(OR^6)_4 \qquad \text{FORMULA IX}$$

wherein each $R^6$, which can be the same or different, is a hydrocarbon radical having 1 to 18 carbon atoms inclusive, preferably 1 to 14 carbon atoms inclusive.

Exemplary of suitable hydrocarbon radicals are alkyl radicals such as methyl, ethyl, n-propyl, isopropyl, butyl, octyl, lauryl, myristyl, stearyl and the like; cycloaliphatic radicals such as cyclopentyl, cyclohexyl and the like; aryl radicals such as phenyl, methylphenyl, chlorophenyl and the like; alkaryl radicals such as benzyl and the like.

Particularly desirable titanates falling within the scope of Formula IX are those wherein each $R^6$ is an alkyl radical having 1 to 18 carbon atoms inclusive, preferably 1 to 14 carbon atoms inclusive, exemplified by tetrabutyl titanate, tetraisopropyl titanate and the like.

Activation of the composition is effected by admixing therewith an organo titanate having at least one readily hydrolyzable group with the result that the readily hydrolyzable group of the organo titanate ester exchanges with an ester group of the silane moieties which are present yielding a polymer which is readily hydrolyzable as is described in copending application Ser. No. 534,354, filed Sept. 23, 1983, now U.S. Pat. No. 4,526,930. The hydrolyzable polymer can be modified, cured and extruded as disclosed in the patents and application noted herein, the disclosures of which are incorporated by reference.

Also, mixtures of silane modified polymers, alcohols and/or titanates can be used in formulating compositions of this invention.

It is to be expected that formulation of the compositions of this invention can be carried out as shown by the example which follows.

EXAMPLE 1

A Brabender mixer, maintained under an argon gas blanket, is charged with 350 grams of an ethylene-vinyltrimethoxy silane copolymer containing about 1.5 percent by weight vinyltrimethoxy silane. When the temperature of the copolymer reaches 120° C., 16.1 grams of 2-ethylhexyl alcohol and 0.25 gram of tetraethyl titanate are added and the contents of the flask are brought to a temperature of 185° C. and maintained at a temperature of 185° C. until cessation of volatiles ($CH_3OH$). The material is formed into test plaques 3 inches by 3 inches by 0.0075 inch and the test plaques subjected to the Monsanto Rheometer test described in detail in U.S. Pat. No. 4,018,852, patented Apr. 19, 1977. It would be expected that the rheometer readings would be as follows:

| Rheometer - lbs-inch | |
| --- | --- |
| initial | >5 |
| 70° C. water bath 24 hours | >5 |

What is claimed is:

1. A relatively water-stable composition comprising a water-curable thermoplastic polymer having hydrolyzable, pendant moieties of the formula:

wherein R is methyl, ethyl or propyl and each V is a hydrocarbon radical having 1 to 18 carbon atoms inclusive or $-(OR)$ wherein R is as previously defined; at least a stoichiometric amount of a primary monohydric alcohol having at least 4 carbon atoms or a secondary monohydric alcohol having at least 3 carbon atoms; and an organo titanate esterification catalyst.

2. A relatively water-stable composition comprising a water-curable thermoplastic polymer having hydrolyzable, pendant moieties of the formula:

wherein R is methyl, ethyl or propyl and each V is a hydrocarbon radical having 1 to 18 carbon atoms inclusive or $-(OR)$ wherein R is as previously defined; at least a stoichiometric amount of a primary monohydric alcohol having 4 to 18 carbon atoms inclusive or a secondary monohydric alcohol having 3 to 18 carbon atoms inclusive; and an organo titanate esterification catalyst.

3. A relatively water-stable composition as defined in claim 1 wherein the said alcohol is 2-ethylhexyl alcohol.

4. A relatively water-stable composition as defined in claim 1 wherein said organo titanate esterification catalyst is tetraethyl titanate.

5. A relatively water-stable composition as defined in claim 1 wherein the water-curable polymer is a copolymer of ethylene and vinyl trimethoxy silane.

6. A relatively water-stable composition as defined in claim 5 wherein the alcohol is 2-ethylhexyl alcohol and said organo titanate esterification catalyst is tetraethyl titanate.

* * * * *